No. 790,397. PATENTED MAY 23, 1905.
E. F. PRICE.
PROCESS OF PRODUCING LOW CARBON METALS OR ALLOYS.
APPLICATION FILED DEC. 10, 1904.
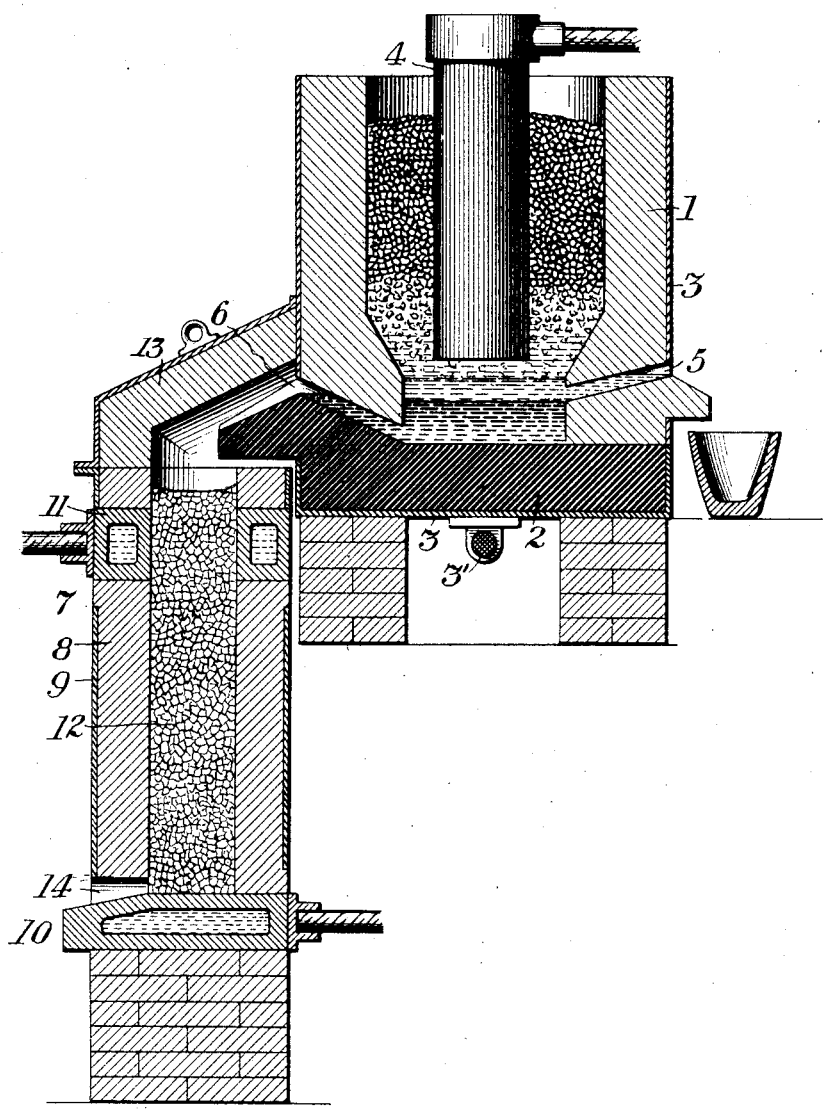
Witnesses:
R. A. Balderson
J. B. Hill
Inventor:
Edgar F. Price,
by Byrnes & Townsend,
Attys.

No. 790,397.

Patented May 23, 1905.

UNITED STATES PATENT OFFICE.

EDGAR F. PRICE, OF NIAGARA FALLS, NEW YORK.

PROCESS OF PRODUCING LOW-CARBON METALS OR ALLOYS.

SPECIFICATION forming part of Letters Patent No. 790,397, dated May 23, 1905.

Application filed December 10, 1904. Serial No. 236,321.

*To all whom it may concern:*

Be it known that I, EDGAR F. PRICE, a citizen of the United States, residing at Niagara Falls, in the county of Niagara and State of New York, have invented certain new and useful Improvements in Processes of Producing Low-Carbon Metals or Alloys, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. A high potential difference is usually maintained between the terminals of the furnace. As the ore is reduced a layer of the ferrochromium accumulates on the hearth, covered by a layer of slag. The molten alloy is tapped out from time to time until the slag has increased to such an amount as to require removal. As the normal slag has a high fusion-point, a flux is added to render it more liquid, and the remaining alloy and slag are finally run out through the metal tap-hole. The furnace is then charged anew, and the process is repeated.

It is important that the ferrochromium produced should be low in carbon. The amount of carbon in the charge is therefore ordinarily kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace. Furthermore, the slag is not kept at a sufficiently high temperature to permit it to be tapped out except by adding large amounts of flux, discontinuing the charging of ore, and employing the energy of the arc merely to liquefy the slag. The heat losses are also increased by the discontinuous mode of working, both the furnace and the depending electrode cooling down when the furnace is emptied. It is also impracticable to effect a clean separation of the metal and slag by removing them successively through a single tap-hole.

According to the present invention, the production of low-carbon ferrochromium and other metals and alloys is effected by a continuous operation comprising two stages. In the first stage an alloy with a relatively high percentage of carbon is produced by smelting a charge containing sufficient carbon to protect the carbon electrodes. The molten high-carbon alloy is then tapped from the reduction-furnace and percolated through a granular body of a decarburizing agent—for example, lime—and the carburized reagent is separated from the low-carbon product. The granular body is preferably heated by interposing it as a resistance-conductor in an electric circuit, both the heated lime and the percolating metal serving to carry the electric current.

Suitable apparatus for carrying out the process is shown in the accompanying drawing, in which the figure is a transverse vertical section of an electric reduction-furnace and a decarburizing-chamber.

The reduction-furnace comprises sides 1, of refractory non-conductive material, such as chromite or magnesia, and a hearth 2, of carbon, surrounded by a metal casing 3, having an electric terminal 3'. The carbon hearth constitutes one electrode. The other electrode is a depending carbon rod 4. Tap-holes 5 6 extend through the side walls at different heights. In using this furnace to carry out the first stage of the process an arc is established between the depending electrode and the carbon hearth and a small amount of the charge—for example, a mixture of chromite, coke, lime, and silica—is fed into the furnace. The charge preferably contains a considerable excess of carbon to protect the electrode 4 from oxidation. The furnace is then gradually filled until in its normal working condition the depending electrode is embedded in the charge. As the ore is reduced superposed layers of slag and ferrochromium collect in the bottom of the furnace and run out through the upwardly-inclined open tap-holes 5 6, the alloy being delivered into the decarburizing-chamber 7. More of the charge mixture is then fed into the reduction-furnace.

The decarburizing-chamber comprises a vertical annular body 8, of refractory non-conductive material, preferably chromite or magnesia, surrounded by a metal casing 9. Beneath the body is a metal hearth 10, preferably a water-cooled steel casting, which serves as one electrode. A water-cooled metal ring 11, arranged in the walls of the chamber near its upper end, serves as the other electrode. The chamber is filled with a granular body 12 of the decarburizing agent—for example, broken lime—which is supported by the metal hearth 10 and lies in contact with the inner surface of the metal ring 11. A heat-retaining hood 13 incloses the upper end of the decarburizing-compartment and the metal-outlet of the reduction-furnace. A tap-hole 14 extends from the lower end of the decarburizing-chamber.

In the second stage of the process the body of broken lime 12 in the chamber 7 is initially raised to a high temperature, as by passing hot products of combustion through it, and the metal or alloy flowing from the tap-hole 6 of the reduction-furnace is delivered upon the upper end of the granular body and percolates slowly through it. The carbon of the alloy is thereby gradually withdrawn, reacting on the lime to produce calcium carbid. The carbid and decarburized alloy are delivered from the lower end of the chamber through the tap-hole 14 and are separated—for example, by allowing them to stratify in a receiving vessel and withdrawing the carbid and metal through tap-holes arranged at different heights. Any carbid which adheres to or is entangled with the metal is decomposed by treating it with water.

In order to maintain the granular body of lime at a high temperature, an electric current is passed between the metal hearth 10 and the metal ring 11 and through the granular body and the molten metal therein, serving as a resistance-conductor. Both the heated lime and the percolating metal serve to carry the current.

I claim—

1. The process of producing low-carbon metals or alloys, which consists in first producing a material relatively high in carbon, percolating the molten high-carbon product through a granular body of a decarburizing agent, and separating the carburized reagent from the low-carbon product, as set forth.

2. The process of producing low-carbon metals or alloys, which consists in first producing a material relatively high in carbon, heating a granular body of a decarburizing agent by interposing the body as a resistance-conductor in an electric circuit, percolating the molten high-carbon product through the heated granular body, and separating the carburized reagent from the low-carbon product, as set forth.

3. The process of producing low-carbon metals or alloys, which consists in first producing a material relatively high in carbon by electrically smelting a charge containing an excess of carbon, separating the resulting slag, heating a granular body of a decarburizing agent by interposing the body as a resistance-conductor in an electric circuit, percolating the molten high-carbon product through the heated granular body, and separating the carburized reagent from the low-carbon product, as set forth.

4. The process of producing low-carbon metals or alloys, which consists in first producing a material relatively high in carbon, percolating the molten high-carbon product through a granular body of highly-heated lime, and separating the resulting calcium carbid from the low-carbon product, as set forth.

5. The process of producing low-carbon metals or alloys, which consists in first producing a material relatively high in carbon, heating a granular body of lime to a high temperature by interposing the body as a resistance-conductor in an electric circuit, percolating the molten high-carbon product through the heated granular body, and separating the resulting calcium carbid from the low-carbon product, as set forth.

6. The process of producing low-carbon metals or alloys, which consists in first producing a material relatively high in carbon by electrically smelting a charge containing an excess of carbon, separating the resulting slag, heating a granular body of lime to a high temperature by interposing the body as a resistance-conductor in an electric circuit, percolating the molten high-carbon product through the heated granular body, and separating the resulting calcium carbid from the low-carbon product, as set forth.

7. The process of producing low-carbon ferrochromium, which consists in first producing ferrochromium relatively high in carbon, percolating the molten high-carbon product through a granular body of a decarburizing agent, and separating the carburized reagent from the low-carbon product, as set forth.

8. The process of producing low-carbon ferrochromium, which consists in first producing ferrochromium relatively high in carbon, heating a granular body of a decarburizing agent by interposing the body as a resistance-conductor in an electric circuit, percolating the molten high-carbon product through the heated granular body, and separating the carburized reagent from the low-carbon product, as set forth.

9. The process of producing low-carbon ferrochromium, which consists in first producing ferrochromium relatively high in carbon by electrically smelting a charge containing an excess of carbon, separating the resulting slag, heating a granular body of a decarburizing agent by interposing the body as a resistance-conductor in an electric circuit, percolating the molten high-carbon product through the heated granular body, and separating the carburized reagent from the low-carbon product, as set forth.

10. The process of producing low-carbon ferrochromium, which consists in first producing ferrochromium relatively high in carbon, percolating the molten high-carbon product through a granular body of highly-heated lime, and separating the resulting calcium carbid from the low-carbon product, as set forth.

11. The process of producing low-carbon ferrochromium, which consists in first producing ferrochromium relatively high in carbon, heating a granular body of lime to a high temperature by interposing the body as a resistance-conductor in an electric circuit, percolating the molten high-carbon product through the heated granular body, and separating the resulting calcium carbid from the low-carbon product, as set forth.

12. The process of producing low-carbon ferrochromium, which consists in first producing ferrochromium relatively high in carbon by electrically smelting a charge containing an excess of carbon, separating the resulting slag, heating a granular body of lime to a high temperature by interposing the body as a resistance-conductor in an electric circuit, percolating the molten high-carbon product through the heated granular body, and separating the resulting calcium carbid from the low-carbon product, as set forth.

In testimony whereof I affix my signature in presence of two witnesses.

EDGAR F. PRICE.

Witnesses:
C. E. BILLINGS,
C. C. MOSHER.